(12) United States Patent
Zhang et al.

(10) Patent No.: US 12,372,981 B2
(45) Date of Patent: Jul. 29, 2025

(54) METHOD AND SYSTEM FOR RHYTHMIC MOTION CONTROL OF ROBOT BASED ON NEURAL OSCILLATOR

(71) Applicant: SHANDONG UNIVERSITY, Shandong (CN)

(72) Inventors: Wei Zhang, Jinan (CN); Yanyun Chen, Jinan (CN); Jiapeng Sheng, Jinan (CN); Xing Fang, Jinan (CN); Wenhao Tan, Jinan (CN); Ran Song, Jinan (CN); Xiaolei Li, Jinan (CN); Jiyu Cheng, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/266,643

(22) PCT Filed: Oct. 18, 2022

(86) PCT No.: PCT/CN2022/125984
§ 371 (c)(1),
(2) Date: Jun. 12, 2023

(87) PCT Pub. No.: WO2023/184933
PCT Pub. Date: Oct. 5, 2023

(65) Prior Publication Data
US 2025/0021107 A1    Jan. 16, 2025

(30) Foreign Application Priority Data
Mar. 31, 2022 (CN) .......................... 202210334049.5

(51) Int. Cl.
G05D 1/495 (2024.01)
G05D 1/60 (2024.01)
(Continued)

(52) U.S. Cl.
CPC ............... *G05D 1/495* (2024.01); *G05D 1/60* (2024.01); *G05D 2101/15* (2024.01); *G05D 2109/12* (2024.01)

(58) Field of Classification Search
None
See application file for complete search history.

(56) References Cited

U.S. PATENT DOCUMENTS

2013/0138020 A1    5/2013   Yasuhara

FOREIGN PATENT DOCUMENTS

| CN | 108772836 A | 11/2018 |
|----|----|----|
| CN | 109866904 A | 6/2019 |

(Continued)

OTHER PUBLICATIONS

Merged Original and Translation of Publication CN 116795123 A (Year: 2022).*

(Continued)

*Primary Examiner* — James J Lee
*Assistant Examiner* — Elizabeth Galyn Martinez
(74) *Attorney, Agent, or Firm* — Oliff PLC

(57) ABSTRACT

A method and a system for rhythmic motion control of a robot based on a neural oscillator, including: acquiring a current state of the robot, and a phase and a frequency generated by the neural oscillator; and obtaining a control instruction according to the acquired current state, phase and frequency and a preset reinforcement learning network so as to control the robot. The preset reinforcement learning network includes an action space, a pattern formation network and the neural oscillator. A control structure designed by the present disclosure, which is composed of the neural oscillator and the pattern formation network, can ensure formation of an expected rhythmic motion behavior; and meanwhile, a designed action space for joint position incre- (Continued)

ment can effectively accelerate the training process of rhythmic motion reinforcement learning, and solve a problem that design of the reward function is time-consuming and difficult in learning with existing model-free reinforcement learning.

8 Claims, 1 Drawing Sheet

(51) Int. Cl.
*G05D 101/15* (2024.01)
*G05D 109/12* (2024.01)

(56) References Cited

FOREIGN PATENT DOCUMENTS

| CN | 110286592 | A |   | 9/2019 |
| CN | 113616193 | A |   | 11/2021 |
| CN | 114740875 | A |   | 7/2022 |
| CN | 114047697 | B | * | 8/2023 |
| CN | 116795123 | A | * | 9/2023 |
| JP | 2006-289602 | A |   | 10/2006 |
| KR | 101100657 | B1 | * | 1/2012 |

OTHER PUBLICATIONS

Merged Original and Translation of Publication CN 114047697 B (Year: 2021).*
Merged Original and Translation of Publication KR 101100657 B1 (Year: 2004).*
Dec. 12, 2022 International Search Report issued in International Patent Application No. PCT/CN2022/125984.
Dec. 12, 2022 Written Opinion issued in International Patent Application No. PCT/CN2022/125984.

* cited by examiner

METHOD AND SYSTEM FOR RHYTHMIC MOTION CONTROL OF ROBOT BASED ON NEURAL OSCILLATOR

CROSS-REFERENCE TO RELATED APPLICATIONS

The present disclosure claims priority of Chinese patent application No. 202210334049.5 titled "METHOD AND SYSTEM FOR RHYTHMIC MOTION CONTROL OF ROBOT BASED ON NEURAL OSCILLATOR" and filed in China National Intellectual Property Administration on Mar. 31, 2022, which is incorporated herein in their entirety by reference.

TECHNICAL FIELD

The present disclosure belongs to the technical field of robot control, in particular to a method and a system for rhythmic motion control of a robot based on a neural oscillator.

BACKGROUND

In order to realize motion control of quadruped robot, better motion performance can be obtained with some traditional control methods, such as model predictive control (MPC) and whole body control (WBC), by involving sensory feedback and complex control theory. Although certain results have been achieved in gait control with these methods, their realization usually requires rich professional knowledge and a long design process.

The applicant found that autonomous learning of a motion strategy of a legged robot can be successfully realized by model-free reinforcement learning (RL) which emerged in recent years. However, a reward function usually cannot directly express an expected rhythmic motion behavior. Furthermore, even a reasonable reward must be carefully designed and adjusted so as to meet needs, because a small adjustment of the reward function may also result in a huge difference in a reinforcement learning behavior. Therefore, it is usually time-consuming and difficult to design the reward function that can realize unbiased learning of robots.

SUMMARY

In order to solve above problems, the present disclosure provides a method and a system for rhythmic motion control of a robot based on a neural oscillator. A control structure designed by the present disclosure, which is composed of a neural oscillator and a pattern formation network, can ensure formation of an expected rhythmic motion behavior; and meanwhile, a designed action space of joint position increment can effectively accelerate the training process of rhythmic motion reinforcement learning.

In a first aspect, the present disclosure provides a method for rhythmic motion control of a robot based on a neural oscillator, including:
acquiring a current state of the robot, and a phase and a frequency generated by the neural oscillator; and
obtaining a control instruction according to the acquired current state, phase and frequency and a preset reinforcement learning network so as to control the robot.

The preset reinforcement learning network includes an action space, a pattern formation network and the neural oscillator. The action space is used for obtaining joint position increment according to the acquired current state. The pattern formation network is used for obtaining a control instruction of a target joint position according to the joint position increment. The neural oscillator is used for adjusting phase transition time of a robot sole trajectory between a swinging stage and a standing stage according to the acquired phase and frequency. The robot is controlled according to the control instruction of the target joint position and the phase transition time of the robot sole trajectory between the swinging stage and the standing stage.

Further, the phase is represented by sine and cosine functions.

Further, when the control instruction of the target joint position is obtained according to the joint position increment, the joint position increment is added with a target joint position at a previous moment so as to obtain a target joint position at a current moment; and a joint torque is calculated according to the target joint position at the current moment.

Further, a maximum joint position increment is determined by a maximum motor speed and a time step.

Further, the neural oscillator outputs the frequency to modulate a phase $\phi$ of each leg, and when the phase $\phi \in [0,\pi)$, a current leg is in a supporting phase stage, and when the phase $\phi \in [\pi,2\pi)$, the current leg is in a swinging phase stage.

Further, a phase at the current moment is:

$$\phi_t = (\phi_{t-1} + 2\pi * f * T)\%2\pi$$

where $\phi_t$ represents the phase at the current moment; $\phi_{t-1}$ represents the frequency at the previous moment; f represents the frequency; and $T$ represents the time step.

Further, a motion problem of the robot is regarded as a Markov decision process, and a frequency item and a phase item are added to a reward item.

In a second aspect, the present disclosure further provides a system for rhythmic motion control of a robot based on a neural oscillator, including:
a data acquisition module configured to acquire a current state of the robot, and a phase and a frequency generated by the neural oscillator; and
a control module configured to obtain a control instruction according to the acquired current state, phase and frequency and a preset reinforcement learning network so as to control the robot.

The preset reinforcement learning network includes an action space, a pattern formation network and the neural oscillator. The action space is used for obtaining joint position increment according to the acquired current state. The pattern formation network is used for obtaining a control instruction of a target joint position according to the joint position increment. The neural oscillator is used for adjusting phase transition time of a robot sole trajectory between a swinging stage and a standing stage according to the acquired phase and frequency. The robot is controlled according to the control instruction of the target joint position and the phase transition time of the robot sole trajectory between the swinging stage and the standing stage.

In a third aspect, the present disclosure further provides an electronic device, including a memory, a processor and a computer program stored in the memory and capable of running on the processor. When the processor executes the program, steps of the method for rhythmic motion control of the robot based on the neural oscillator described in the first aspect are realized.

In a fourth aspect, the present disclosure further provides a computer-readable storage medium, storing a computer program thereon. The program, when executed by a processor, realizes steps of the method for rhythmic motion control of the robot based on the neural oscillator described in the first aspect.

Compared with the prior art, the present disclosure has following beneficial effects.

The control structure designed by the present disclosure, which is composed of the neural oscillator and the pattern formation network, can ensure formation of an expected rhythmic motion behavior; and meanwhile, a designed action space for joint position increment can effectively accelerate the training process of rhythmic motion reinforcement learning, and solve a problem that design of the reward function is time-consuming and difficult in learning with existing model-free reinforcement learning.

BRIEF DESCRIPTION OF THE DRAWINGS

Drawings of the specification, which constitute a part of the present disclosure, are used to provide further understanding of the present disclosure, and illustrative embodiments of the present disclosure and their descriptions are used to explain the present disclosure, and do not constitute undue limitations on the present disclosure.

DETAILED DESCRIPTION

Figure 1:
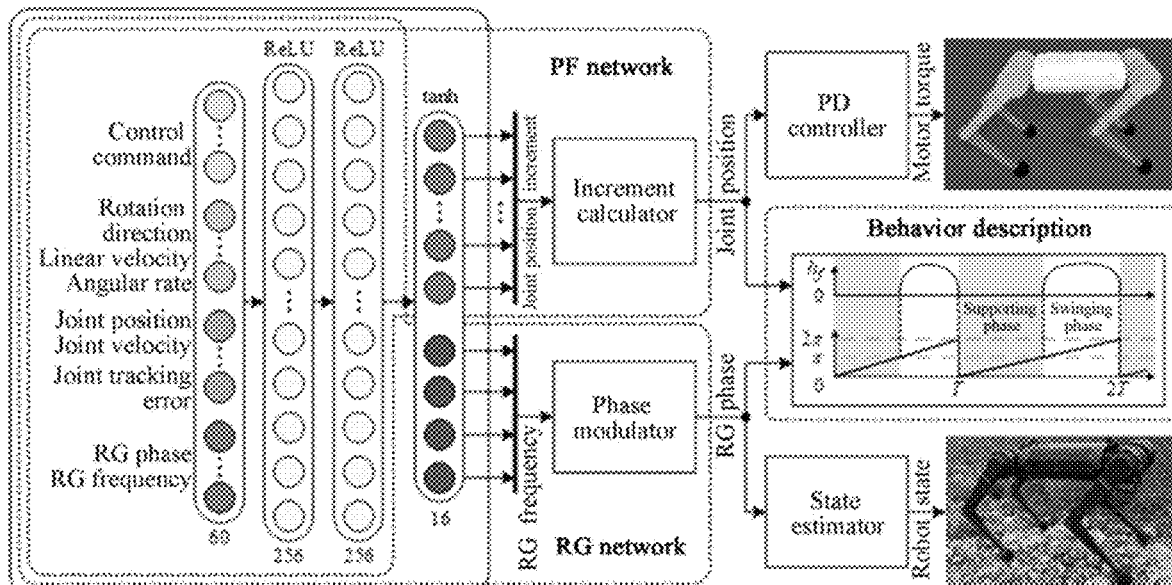
FIG. 1 is an RL learning framework according to Embodiment 1 of the present disclosure.

The present disclosure will be further explained with reference to accompanying drawings and embodiments.

It is to be noted that following detailed description is illustrative and is intended to provide further explanation of the present disclosure. Unless otherwise specified, all technical and scientific terms used herein have the same meaning as commonly understood by an ordinary person skilled in the art to which the present disclosure belongs.

rhythmic motion widely exists in human and animal behaviors, such as in walking, running and steering. It is very important to change a motion pattern flexibly for animals to pass smoothly in a harsh environment. Therefore, it is an important subject in biology and robotics to study mechanism of different biological driving rhythmic motions. It has been found in physiological researches that a central pattern generator, that is, a neural circuit of an organism in spinal cord, plays a key role in generation of rhythmic motion, which can produce appropriate rhythmic information to modulate output of motoneurons. Command information from a motion area of midbrain and sensory afferent information from proprioceptors and exteroceptors can change rhythm patterns to adapt to different motion scenes. Inspired by this, some researchers provide rhythmic information by designing a simple phase oscillator so as to obtain rhythmic motion behavior instructions.

At present, there are mainly two types of control methods for the quadruped robot: a model-based control method and a learning-based control method. The model-based control method has an early origin and rich theoretical basis, and has achieved good control effect in specific scenes. Fukuoka et al. designed a basic phase oscillator to generate a sole trajectory. Bloch et al. accurately modeled a driving system of a robot, which makes the algorithm obtain good motion performance on a hardware platform. In order to obtain more robust control performance, Carlo et al. proposed a new model predicted control (MPC) method realized by using a simplified kinetic model. On a basis of Carlo's method, Bered et al. used a state machine to generate a robot sole reference trajectory, and used MPC to plan a ground reaction force, which further improves the robot motion performance. However, these methods require a lot of accurate prior knowledge about a robot structure and kinetics.

In recent years, a data-driven learning method has become an effective alternative for robots to learn motion behaviors autonomously. Hanoha et al. used an end-to-end RL framework to train a robot to learn to walk. Da et al. proposed a hierarchical controller architecture, in which a high-level controller is trained by RL and a low-level controller provided a predefined fixed motion gait. This architecture uses a traditional control method to accelerate a RL learning process, but it also limits robot's motion ability. Huang Bo et al. realized stable walking and fall recovery of a robot by carefully designing a reward function. Sickmann et al. have defined a series of reward functions to specify and realize biped gait, which also requires rich prior knowledge as a basic support.

Embodiment 1

In order to solve a problem of rhythmic motion control of a quadruped robot and being inspired by regulation mechanism of rhythmic motion of vertebrate, in this embodiment, a bio-neural oscillator, namely a rhythm generator (RG), is added under an existing reinforcement learning framework, to realize natural stimulation of a rhythmic motion pattern of a legged robot. Specifically, this embodiment uses an RG network to adjust phase transition time of a robot sole trajectory between a swinging stage and a standing stage, and a pattern formation (PF) network to output 12 motor control commands of the robot. Similar control structures exist in a mammalian nervous system. The RG network determines durations of flexor and extensor phases, while the PF network is responsible for generating information that periodically activates flexor and extensor motoneurons. From a point of view of engineering realization, this embodiment instantiates a proposed bionic rhythmic motion control structure by encouraging the robot to keep its sole contact with ground when in a swinging phase and when in a supporting phase upon feet are lifted. Existence of periodic rhythm signals of legs ensures formation of animal-like rhythmic motion behaviors of the legged robot. With the control structure proposed in this embodiment, a training process can focus on training the legged robot to complete a main motion task, such as forward motion, left-right motion and steering motion.

In addition, notably, phase estimation of the legs provided by the RG network can also improve accurate estimation of an ontology speed and state by a robot platform when a strategy is deployed on a real robot. At present, state estimation technology of the quadruped robot requires contact phase information of the legs of the robot in contact with the ground to fuse measurement information from an inertial measurement unit (IMU) and joint state information so as to complete estimation of a state of a whole body, or use force sensors to realize detection of retrogression contact information. However, addition of the sensors may increase overall cost and power consumption of the robot and reduce robustness of the system.

Different from previous research work that directly outputs a joint position of the robot, a RL strategy in this embodiment outputs the joint position increment, which is added with a target joint position command at a previous moment to obtain a motor control command at a current moment. Design of this new action space can accelerate training speed of rhythmic motion, because an action range that can be explored with the RL strategy is limited near a joint position at the current moment. With limitation of a maximum motor speed, all of target joint position commands that can cause joints of the robot to exceed the maximum motor speed are not conducive to a training process, and design of this action space avoids exploration and selection of some invalid motor commands, thus greatly accelerating the training process.

Figure 2:
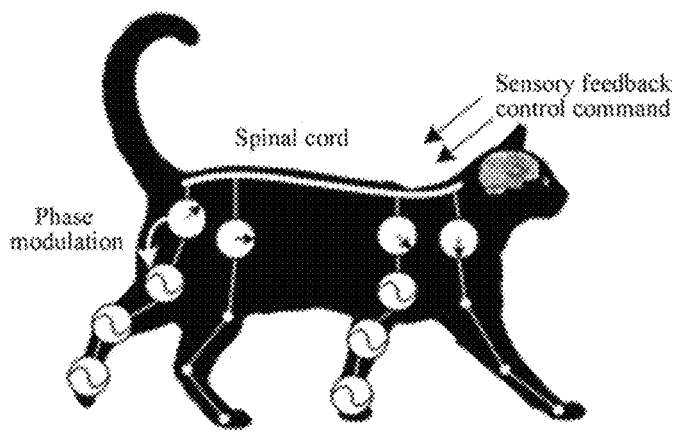
FIG. 2 is a diagram of rhythmic motion mechanism of a spinal animal in Embodiment 1 of the present disclosure.

This embodiment provides a method for rhythmic motion control of a robot based on a neural oscillator, aiming at naturally stimulating rhythmic motion behaviors of a quadruped robot, which is inspired by biological motion mechanism, and accelerating a RL learning process. As shown in FIG. 1, in this embodiment, a proposed learning framework can be divided into two parts: a bionic control structure composed of RG and PF networks, and design of a new action space (joint position increment), as shown in FIG. 2, which is a diagram of rhythmic motion mechanism of a spinal animal.

In this embodiment, a motion problem of the quadruped robot is regarded as a partially observable Markov decision processes (POMDP) $\langle S, A, R, P, \gamma \rangle$, where S and A represent a state and the action space, respectively; $R(S_t, S_{t+1}) \to \mathbb{R}$ represents the reward function; $P(s_{t+1}|s_t,\alpha_t)$ represents transition probability; and $\gamma \in (0,1)$ represents a reward discount factor. The quadruped robot takes an action $\alpha$ in a current state s, gets a scalar reward r, and then moves to a next state $s_{t+1}$, which is determined by a probability distribution of state transition $P(s_{t+1}|s_t,\alpha_t)$. An overall goal of training of the quadruped robot is to find an optimal strategy $\pi_\Phi^*$ to maximize a discount reward in the future, $\Phi^*$ is:

$$\Phi^* = \underset{\Phi}{\operatorname{argmax}} E\left[\sum_{t=0}^{T-1} \gamma^t R(s_t, s_{t+1})\right] \quad (1)$$

As shown in FIG. 1, in this embodiment, an input state $S_t \in \mathbb{R}^{60}$ includes a three-dimensional control command $\hat{c}$ (including a forward velocity $\hat{v}_x$, a lateral velocity $\hat{v}_y$ and a steering angular rate $\hat{\omega}_z$), a three-dimensional linear velocity of a base v, a three-dimensional angular rate of the base $\omega$, a three-dimensional rotation direction $\theta^g$ (expressed as a direction of a gravity vector in an IMU coordinate system), a 12-dimensional joint position q, a 12-dimensional joint velocity $\dot{q}$, a 12-dimensional joint position error $q_e$ (the joint position q minus the target joint position $\hat{q}$), a 8-dimensional RG phase generated by the RG network and a 4-dimensional RG frequency f (where the RG phase $\phi$ is represented by sine and cosine functions).

An output action $\alpha_t \in \mathbb{R}^{16}$ includes the 4-dimensional RG frequency f and a 12-dimensional joint position increment $\Delta q$. Then the target joint position command $\hat{q}$ is calculated according to formula (2). Finally, a group of PD controllers are used for calculating a joint torque, that is $\tau = K_p(\hat{q}-q) + K_d(\hat{\dot{q}}-\dot{q})$, where $K_p$ and $K_d$ are set to fixed values in simulation and deployment, and the target joint velocity $\hat{\dot{q}}$ is set to 0.

The RL strategy in this embodiment outputs the joint position increment $\Delta q_t$, and the target joint position $q_t$, at the current moment is defined as:

$$\hat{q}_t = \hat{q}_{t-1} + \Delta q_t \quad (2)$$

where $\hat{q}_{t-1}$ is a target joint position at a previous moment.

Due to limitation of robot operation performance, a given target joint position command must not exceed operation performance of the motor. Therefore, in practice, a maximum joint position increment $\Delta q_{max}$ is determined by a maximum motor speed $\dot{q}_{max}$ and a time step T, and is defined as $$\Delta q_{max} = \dot{q}_{max} * T \quad (3)$$

In this embodiment, the RG network outputs the frequency f to modulate a phase $\phi$ of each leg, and is defined as:

$$\phi_t = (\phi_{t-1} + 2\pi * f * T)\%2\pi \quad (4)$$

where $\phi \in [0,2\pi)$ represents a current leg is in a supporting phase when $\phi \in [0,\pi)$, and in a swinging phase when $\phi \in [\pi,2\pi)$; $\phi_{t-1}$ represents a frequency at the previous moment; f represents the frequency; T represents the time step; and % represents a remainder operation.

In the swinging phase, the robot is encouraged to lift a corresponding foot, while in the supporting phase, the robot is rewarded to keep the corresponding foot in contact with ground. Because the RG frequency f is non-negative, a stepping period of the quadruped robot must alternate between the swinging phase and the supporting phase, which improves information guarantee for appearance of the rhythmic motion behaviors. In practical deployment, a RG phase is used for estimating sole contact, which is very important for a state estimator to obtain an accurate linear velocity of the base.

Design of the PF network is similar to function in previous work, that is, a robot state is used as an input state to output motor commands. However, in the embodiment, the action space is defined as the joint position increment, and a motion behavior generated by the action space is largely regulated by the RG network.

In this embodiment, the reward function encourages the robot to follow an upper level of control commands and keep balance and maintain the rhythmic motion. A target linear velocity of the base is expressed as $\hat{v}$, a target angular velocity of the base is expressed as $\hat{\omega}$, a rotation direction of the base (representing a roll-pitch-yaw angle of the base) is expressed as $\theta$, a joint position of a standing posture is expressed as $q_{ref}$, a sole velocity is expressed as $v_f$, a distance between the sole and the ground is expressed as $h_f$, a binary sole contact index provided by the RG network is expressed as $I_f$, a real binary sole contact index provided by a physical simulator is expressed as $\hat{I}_f$, an original output of the RL strategy is expressed as o, a leg in the swinging phase is defined as $\bullet_{swing}$, and a leg in the supporting phase is defined as $\bullet_{stance}$, $l_1$ norm is defined as $|\bullet|$, $l_2$ norm is defined as $\|\bullet\|$. For sake of simplicity, command factors shared among reward items in this application are expressed as $c_x = 1/|\hat{v}_x|$, $c_y=1/|\hat{v}_y|$ and $c_w=1/|\hat{\omega}_z|$. Reward for each time step $r_t$ is defined as a sum of following reward items:

1. Forward Velocity:

$$2\exp(-3c_x*(v_x^t-\hat{v}_x^t)^2) \quad (5)$$

2. Lateral Velocity:

$$2\exp(-3c_y*(v_t^t-\hat{v}_y^t)^2) \quad (6)$$

3. Angular Rate:

$$1.5\exp(-1.5c_w*(\omega_z^t-\hat{\omega}_z^t)^2) \quad (7)$$

4. Balance:

$$1.3(\exp(-2.5c_x*|v_z^t|^2)+\exp(-2c_x*\|\omega_{xy}^t\|^2)) \quad (8)$$

5. Body Twist:

$$-0.6c_x*\|\theta_{xy}^t\| \quad (9)$$

6. Sole Sideslip:

$$-0.07c_x*\|v_{f,stance,xy}^t\| \quad (10)$$

7. Sole Support:

$$\sum_{i=1}^{4}(h_{f,stance,i}^t<0.01) \quad (11)$$

8. Sole Empty:

$$0.7*\sum_{i=1}^{4}(h_{swing,i}^t>0.01) \quad (12)$$

9. z Axis Velocity of Sole:

$$-0.03c_x*|v_{f,z}^t|^2 \quad (13)$$

10. Joint Restrictions:

$$-0.8c_x*\|q^t-q_{ref}^t\|^2 \quad (14)$$

11. Joint Torque:

$$-0.0012*c_x*|\tau^t| \quad (15)$$

12. Joint Velocity:

$$-0.0008*c_x*\|\dot{\theta}^t\|^2 \quad (16)$$

13. Smooth Strategy Output:

$$-0.016*c_x*\|o^t-o^{t-1}\| \quad (17)$$

14. RG Frequency:

$$-0.03c_x*|f_{stance}^t| \quad (18)$$

15. RG Phase:

$$\sum_{i=1}^{4}(I_{f,i}^t-\hat{I}_{f,i}^t) \quad (19)$$

Except for Item 14 and Item 15, which are newly proposed reward functions in this embodiment and are effective in RG and PF network structures, all remaining reward functions have been verified in the previous work. Items 1 to 5 enable the robot to follow commands and keep the base balanced. Items 6 to 8 are the key to stimulate the robot to form a rhythmic motion pattern. According to different stages of the leg, the robot is correspondingly rewarded to lift its foot periodically or keep in contact with the ground so as to realize formation of the rhythmic motion. Notably, in previous research work, a sole contact phase is provided by a sole contact detection function of the physical simulator, while in the embodiment, the sole contact phase is calculated with an output of the RG network. In other words, with the RG and PF network structures proposed in this embodiment, the sole contact phase can be directly modulated by the RL strategy to facilitate the robot to form the rhythmic motion behaviors. Items 9 to 13 encourage the robot to obtain smooth and efficient motion behaviors. Item 14 estimates that the robot is more in the supporting phase so as to reduce energy consumption. Item 15 is used for reducing difference between the sole contact estimation provided by the RG network and the real sole contact provided by the physical simulator, which plays an important role in accurate estimation of a robot state during a deployment stage by using a state estimator.

In this embodiment, course learning is introduced to cause the robot to learn the main task firstly (follow commands and keep the balance) and prevent the robot from falling into local optimal strategies such as staying still because a too large reward factor of a constraint item. The training process starts with a multiplication course $k_c=0.3(k_c\in[0.3,1])$ added to items 4 and 15 of the reward function (i.e. formula (8) and formula (19)), and then gradually increases $k_c$ to make the motion behaviors gradually meet other constraints; where, $k_c^t$ is defined as $k_c^t=(k_c^{t-1})^{k_d}$, $k_d \in [0,1]$ represents a speed for which $k_c^t$ reaches a maximum value of 1.

In this embodiment, domain randomization is adopted for overcoming a gap between simulation and actual deployment, and the robot is facilitated to obtain a more robust control strategy by changing the physical parameters of the robot and adding a sensor noise. Upper and lower limits of randomized physical parameters and a range of the sensor noise are shown in Table 1. All parameters and noise are average sampled. PPO hyperparameter settings for reinforcement learning are shown in Table 2.

TABLE 1

Upper and lower limits of randomized physical parameters and sensor noise

| Parameter name | Lower limit | Upper limit |
| --- | --- | --- |
| Mass | 80% | 120% |
| Inertial | 50% | 150% |
| Delay | 16 ms | 28 ms |
| Power ratio of motor | 80% | 120% |
| Terrain friction | 0.2 | 1 |
| Linear velocity noise | −0.08 m/s | 0.08 m/s |
| Angular rate noise | −0.3 rad/s | 0.3 rad/s |
| Rotation angle noise | −0.08 rad | 0.08 rad |
| Joint position noise | −0.01 rad | 0.01 rad |
| Joint velocity noise | −1.2 rad/s | 1.2 rad/s |

TABLE 2

PPO hyperparameter settings

| Hyperparameter | Value |
| --- | --- |
| Batch size | 32768(1024 × 32) |
| Mini-batch size | 8192(1024 × 8) |
| Clip range | 0.2 |
| Entropy efficient | 0.0025 |
| Learning rate | 3.5e−4 |
| Discount factor | 0.992 |
| GAE discount factor | 0.95 |
| Desired KL-divergence | 0.015 |

Embodiment 2

This embodiment provides a system for rhythmic motion control of a robot based on a neural oscillator, including:

a data acquisition module configured to acquire a current state of the robot, and a phase and a frequency generated by the neural oscillator; and a control module configured to obtain a control instruction according to the acquired current state, phase and frequency and a preset reinforcement learning network so as to control the robot.

The preset reinforcement learning network includes an action space, a pattern formation network and the neural oscillator. The action space is used for obtaining joint position increment according to the acquired current state. The pattern formation network is used for obtaining a control instruction of a target joint position according to the joint position increment. The neural oscillator is used for adjusting phase transition time of a robot sole trajectory between a swinging stage and a standing stage according to the acquired phase and frequency. The robot is controlled according to the control instruction of the target joint position and the phase transition time of the robot sole trajectory between the swinging stage and the standing stage.

An operation method of the system is the same as that of the method for rhythmic motion control of a robot based on the neural oscillator in Embodiment 1, which will not be repeatedly described here again.

Embodiment 3

This embodiment provides an electronic device, including a memory, a processor and a computer program stored in the memory and capable of running on the processor. When the processor executes the program, steps of the method for rhythmic motion control of the robot based on the neural oscillator described in Embodiment 1 are realized.

Embodiment 4

This embodiment provides a computer-readable storage medium, storing a computer program thereon. The program, when executed by a processor, realizes steps of the method for rhythmic motion control of the robot based on the neural oscillator described in Embodiment 1.

The above is only specific embodiments of the present disclosure, and is not intended to limit the present disclosure, and modifications and variations can be made in the present disclosure for those skilled in the art. Any modification, equivalent substitution, improvement, and the like made within the spirit and principle of the present disclosure shall be encompassed within the protection scope of the present disclosure.

What is claimed is:

1. A method for rhythmic motion control of a robot based on a neural oscillator, comprising:

acquiring a current state of the robot, and a phase and a frequency generated by the neural oscillator; and obtaining a control instruction according to the acquired current state, phase and frequency and a preset reinforcement learning network so as to control the robot, wherein the preset reinforcement learning network comprises an action space, a pattern formation (PF) network and a rhythm generator (RG) network; wherein, the action space is configured to obtain joint position increment according to the acquired current state; the PF network is configured to obtain a control instruction of a target joint position according to the joint position increment; and the RG network is configured to adjust phase transition time of a robot sole trajectory between a swinging stage and a standing stage according to the acquired phase and frequency, the robot being controlled according to the control instruction of the target joint position and the phase transition time of the robot sole trajectory between the swinging stage and the standing stage;

wherein, a motion problem of the robot is regarded as a Markov decision process, and a frequency item and a phase item that are effective reward functions in the RG and PF networks are added to a reward item; wherein, the frequency item is configured to estimate that the robot is more in a supporting phase so as to reduce energy consumption; the RG frequency is:

$$-0.03 c_x * |f_{stance}^t|; \text{ and}$$

the phase item is configured to reduce difference between a sole contact estimation provided by the RG network and a real sole contact provided by a physical simulator; the RG phase is:

$$\sum_{i=1}^{4}\left(I_{f,i}^{t}-\hat{I}_{f,i}^{t}\right).$$

2. The method for rhythmic motion control of the robot based on the neural oscillator according to claim 1, wherein the phase is represented by sine and cosine functions.

3. The method for rhythmic motion control of the robot based on the neural oscillator according to claim 1, wherein when the control instruction of the target joint position is obtained according to the joint position increment, the joint position increment is added with a target joint position at a previous moment so as to obtain a target joint position at a current moment; and a joint torque is calculated according to the target joint position at the current moment.

4. The method for rhythmic motion control of the robot based on the neural oscillator according to claim 3, wherein a maximum joint position increment is determined by a maximum motor speed and a time step.

5. The method for rhythmic motion control of the robot based on the neural oscillator according to claim 1, wherein the RG network outputs the frequency to modulate a phase ϕ of each leg, and when the phase ϕ∈[0, π), a current leg is in a supporting phase stage, and when the phase ϕ∈[π, 2π), the current leg is in a swinging phase stage.

6. The method for rhythmic motion control of the robot based on the neural oscillator according to claim 5, wherein a phase at a current moment "t" is:

$$\phi_t = (\phi_{t-1} + 2\pi * f * T)\%2\pi$$

where $\phi_t$ represents the phase at the current moment "t"; $\phi_{t-1}$ represents the phase at a previous moment "t−1"; f represents the frequency; T represents a time step; and, % represents a remainder operation.

7. An electronic device, comprising a memory, a processor and a computer program stored in the memory and capable of running on the processor, wherein when the processor executes the program, steps of the method for rhythmic motion control of the robot based on the neural oscillator according to claim 1 are realized.

8. A computer-readable storage medium, storing a computer program thereon, wherein the program, when executed by a processor, realizes steps of the method for rhythmic motion control of the robot based on the neural oscillator according to claim 1.

* * * * *